Patented Nov. 4, 1930

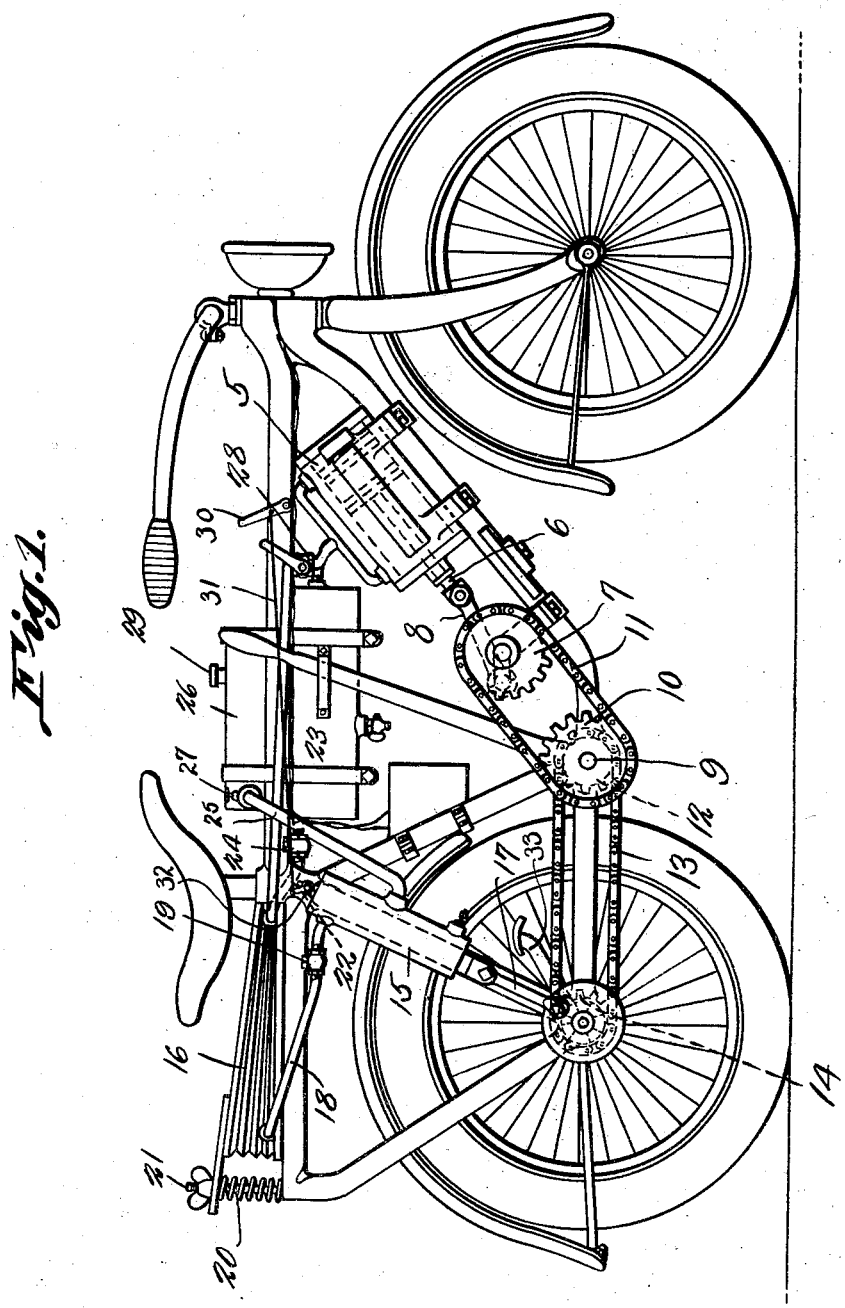

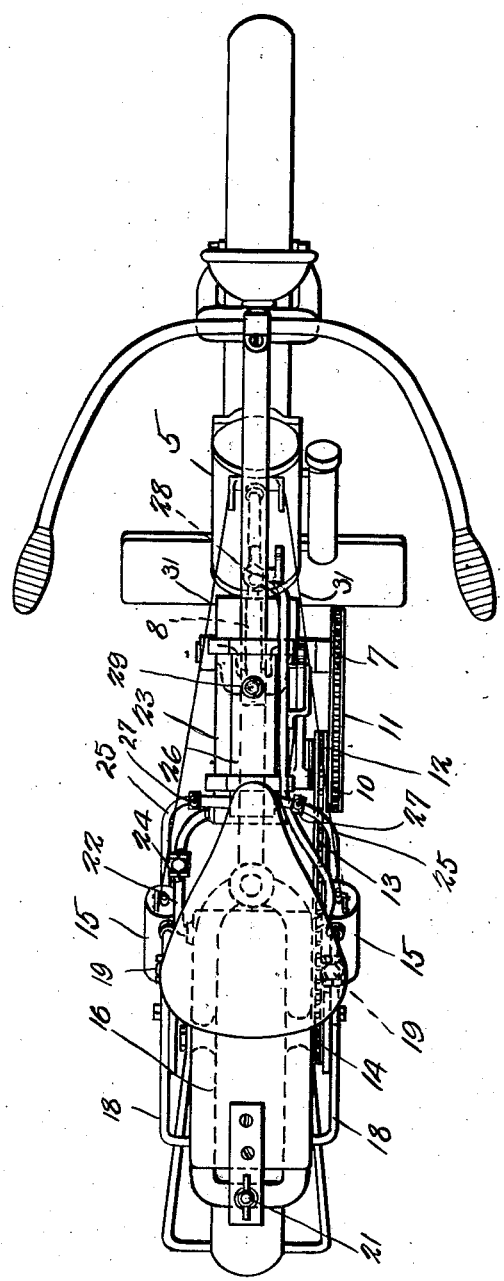

1,780,705

UNITED STATES PATENT OFFICE

ROBERT E. FORMAN, OF CINCINNATI, OHIO

AIR-PROPELLED MOTOR CYCLE

Application filed June 1, 1928. Serial No. 282,149.

This invention relates to a motor-cycle, the primary object of the invention being to provide a motor cycle operated by an air motor receiving its power from a compressed air tank carried by the motor-cycle into which air is compressed by the action of the rear wheels of the motor-cycle, after the motor-cycle has been set in motion.

Another object of the invention is to provide a motor of this type including means whereby air may be forced into a storage tank so that the initial power may be supplied to the motor.

A still further object of the invention is to provide means for compressing air in a storage tank and admitting water to the air in its passage to the storage tank causing an expansion to create power.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is an elevational view of a motorcycle equipped with an air motor constructed in accordance with the invention.

Figure 2 is a plan view thereof.

Referring to the drawings in detail the invention is shown as mounted on the frame of a motor-cycle, and includes a cylinder 5 in which a piston operates, the piston embodying a rod 6 that imparts movement to the sprocket 7 through the medium of the link 8. Movement of the sprocket 7 is transmitted to the shaft 9 through the sprocket 10 mounted on the shaft 9, and the chain 11 which operates over the sprockets.

A small sprocket 12 is mounted on the shaft 9 and imparts movement to the rear wheel through the medium of the chain 13 and sprocket 14, the sprocket 14 being mounted on the rear axle of the motor-cycle. Mounted on the rear fork of the motor-cycle frame at opposite sides thereof are compressors 15 that also embody pistons which operate to compress air in the tank 16. The pistons of the compressors are operated by means of the links 17 that connect eccentrically with disks mounted on the rear axle.

The upper ends of the compressors 15 communicate with the expansion tank 16, through the pipes 18, there being provided check valves 19 in the pipes to prevent return of the air after it has been forced into the pipe 18. This tank 16 is in the form of a bellows 18 so that the tank will be permitted to expand as air is forced thereinto, thereby relieving excess pressure in the tank. An adjusting mechanism including coiled spring 20 and bolt 21 provides means to limit the expansion of the tank 16. It will also be seen that owing to the construction of the expansion tank 16, the tank may be operated in the same manner as a bellows to force air into the storage tank, to be hereinafter more fully described, so that the initial power may be directed to the engine cylinder.

At the forward end of the expansion tank 16 is a pipe 22 that extends into the storage tank 23, there being provided a one-way valve 24 to permit air to pass from the expansion tank to the tank 23, but prevent reverse movement of the air. Pipes indicated at 25 establish communication between the compressors 15 and the water tank 26, so that water may be fed in drops to the compressors at points intermediate the ends of the compressors, a valve 27 being provided for regulating the passage of water through the pipes.

As water is admitted to the compressors, the compressors being hot, due to friction, the water is converted into steam and an expansion is set up resulting in the generation of power. A control valve indicated at 28 controls the passage of air to the engine so that the operator may control the speed of the engine by admitting greater or less quantities of the air to the engine. Mounted on the water tank is a gauge 29 so that the pressure may be determined at all times.

Pivotally supported adjacent to the handle bars, or at a place in easy access to the operator, is a lever 30 to which the rod 31 is connected that extends rearwardly and connects with the valve 32 designed to control the passage of air from the compressors, the valve being of the relief type.

A clutch of suitable construction is mounted at the rear axle and is designed to clutch the rear wheel to the axle, there being provided a clutch pedal 33 so that the operator may operate the clutch to control the movements of the motor-cycle.

In the operation of the device the expansion tank 16 is operated by hand to store up air in the tank 23, whereupon the valve 28 is operated allowing air to pass to the engine cylinder, which in turn imparts rotary movement to the sprockets and rear wheel through the chains.

As the motor-cycle descends a hill, it is obvious that the rear wheel will act to operate the compressors to force air into the expansion tank, which in turn supplies moistened air to the storage tank.

I claim:

A motor-cycle propelling means including a motor embodying a cylinder, a piston operating in the cylinder, means for transmitting movement of the piston to the drive wheels of the motor-cycle, a compressed air tank, a pipe establishing communication between the compressed air tank and cylinder, a manually operated expansion tank for providing the initial supply of compressed air to the compressed air tank, a pipe for establishing communication between the compressed air tank and expansion tank, a compressor operated by the momentum of the motor-cycle, a pipe establishing communication between the compressor and the expansion tank, a water tank mounted above the compressor, a pipe establishing communication between the water tank and the compressor for delivering drops of water to the compressor.

In testimony that I claim the foregoing as my own, I have hereto affixed my signature.

ROBERT E. FORMAN.